(12) United States Patent
Botti

(10) Patent No.: US 10,895,355 B2
(45) Date of Patent: Jan. 19, 2021

(54) ASSEMBLY AND METHOD FOR REALISING A LAMP INCORPORATED INTO A MASONRY WALL

(71) Applicant: SIMES S.p.A., Brescia (IT)

(72) Inventor: Roberto Botti, Brescia (IT)

(73) Assignee: SIMES S.p.A., Brescia (IT)

( * ) Notice: Subject to any disclaimer, the term of this patent is extended or adjusted under 35 U.S.C. 154(b) by 317 days.

(21) Appl. No.: 15/774,314

(22) PCT Filed: Nov. 11, 2016

(86) PCT No.: PCT/IB2016/056807
§ 371 (c)(1),
(2) Date: May 8, 2018

(87) PCT Pub. No.: WO2017/081653
PCT Pub. Date: May 18, 2017

(65) Prior Publication Data
US 2020/0182419 A1 Jun. 11, 2020

(30) Foreign Application Priority Data

Nov. 13, 2015 (IT) ........................ 102015000072451
Aug. 9, 2016 (IT) ........................ 102016000083693

(51) Int. Cl.
*F21S 8/02* (2006.01)
*E04G 15/06* (2006.01)
(Continued)

(52) U.S. Cl.
CPC ............ *F21S 8/024* (2013.01); *E04G 15/063* (2013.01); *F21V 21/04* (2013.01); *F21V 33/006* (2013.01); *H02G 3/20* (2013.01)

(58) Field of Classification Search
CPC ........ F21S 8/024; E04G 15/063; F21V 21/04; F21V 33/006
(Continued)

(56) References Cited

U.S. PATENT DOCUMENTS 5,683,170 A * 11/1997 Blaha ...................... E01C 17/00
362/145
7,070,294 B2 * 7/2006 Patti ....................... E01C 17/00
362/153.1

(Continued)

FOREIGN PATENT DOCUMENTS

DE 1428735 A1 3/1996
DE 19510819 A1 9/1996
(Continued)

OTHER PUBLICATIONS

International Search Report PCT/IB2016/056807 dated Feb. 2, 2017.

*Primary Examiner* — Bryon T Gyllstrom
(74) *Attorney, Agent, or Firm* — Michael Fainberg; Arent Fox LLP

(57) ABSTRACT

An assembly for realising a lamp incorporated into a masonry wall, comprises a lamp housing that delimits a lamp seat suitable to house a lamp body, and a mould suitable to be removably fixed to the lamp housing and to the inner side of a formwork in which the pouring is carried out, so as to realise, after pouring cement in the formwork, a light-emission cavity open on the outer surface of the masonry wall. The mould is suitable to rigidly support the lamp housing before and during the pouring of the cement and is provided with mould fastening means suitable to removably fix the mould to the inner side of the formwork.

34 Claims, 16 Drawing Sheets

(51) Int. Cl.
  *F21V 21/04* (2006.01)
  *F21V 33/00* (2006.01)
  *H02G 3/20* (2006.01)
(58) Field of Classification Search
  USPC .......................................................... 362/147
  See application file for complete search history.

(56) References Cited

U.S. PATENT DOCUMENTS

| | | | |
|---|---|---|---|
| 7,556,394 B2* | 7/2009 | Patti | E01C 17/00 362/153.1 |
| 10,066,807 B2* | 9/2018 | Clauss | F21S 8/02 |
| 2005/0024856 A1* | 2/2005 | Helenowski | F21V 33/006 362/147 |
| 2008/0062679 A1* | 3/2008 | Hartman | F21V 15/01 362/145 |
| 2012/0262911 A1* | 10/2012 | Schweizer | F21V 33/006 362/183 |
| 2013/0216759 A1* | 8/2013 | Lauro | E04G 15/063 428/68 |
| 2013/0308302 A1* | 11/2013 | Hartman | F21V 21/02 362/147 |
| 2020/0182419 A1* | 6/2020 | Botti | F21V 21/04 |

FOREIGN PATENT DOCUMENTS

| | | |
|---|---|---|
| DE | 19805473 A1 | 8/1999 |
| DE | 102006011094 A1 | 9/2007 |
| EP | 1147339 A1 | 10/2001 |
| EP | 2696457 A2 | 2/2014 |

* cited by examiner

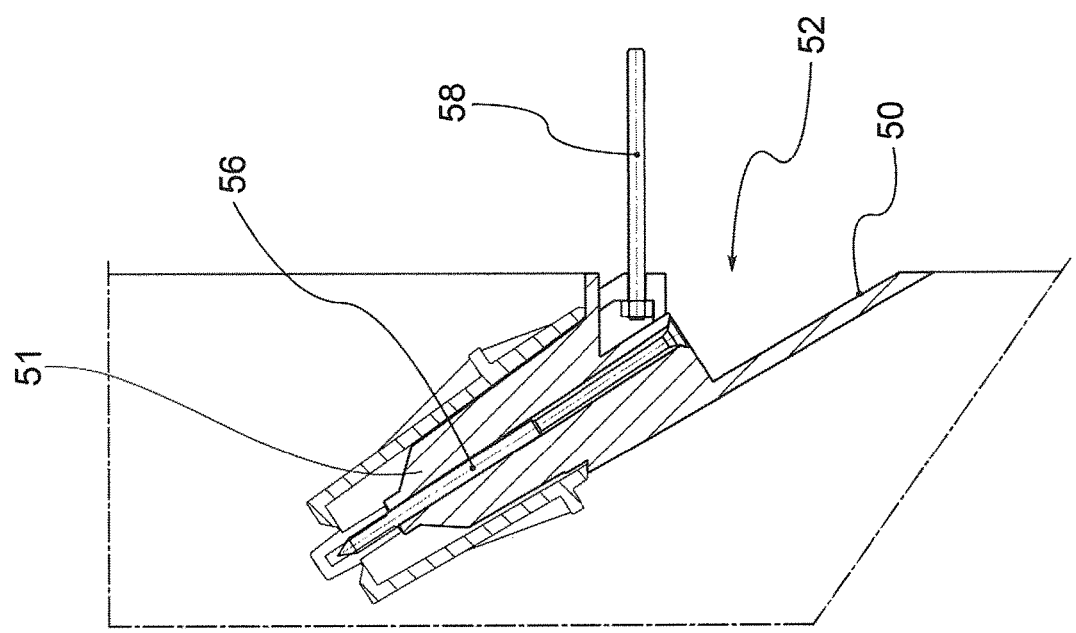
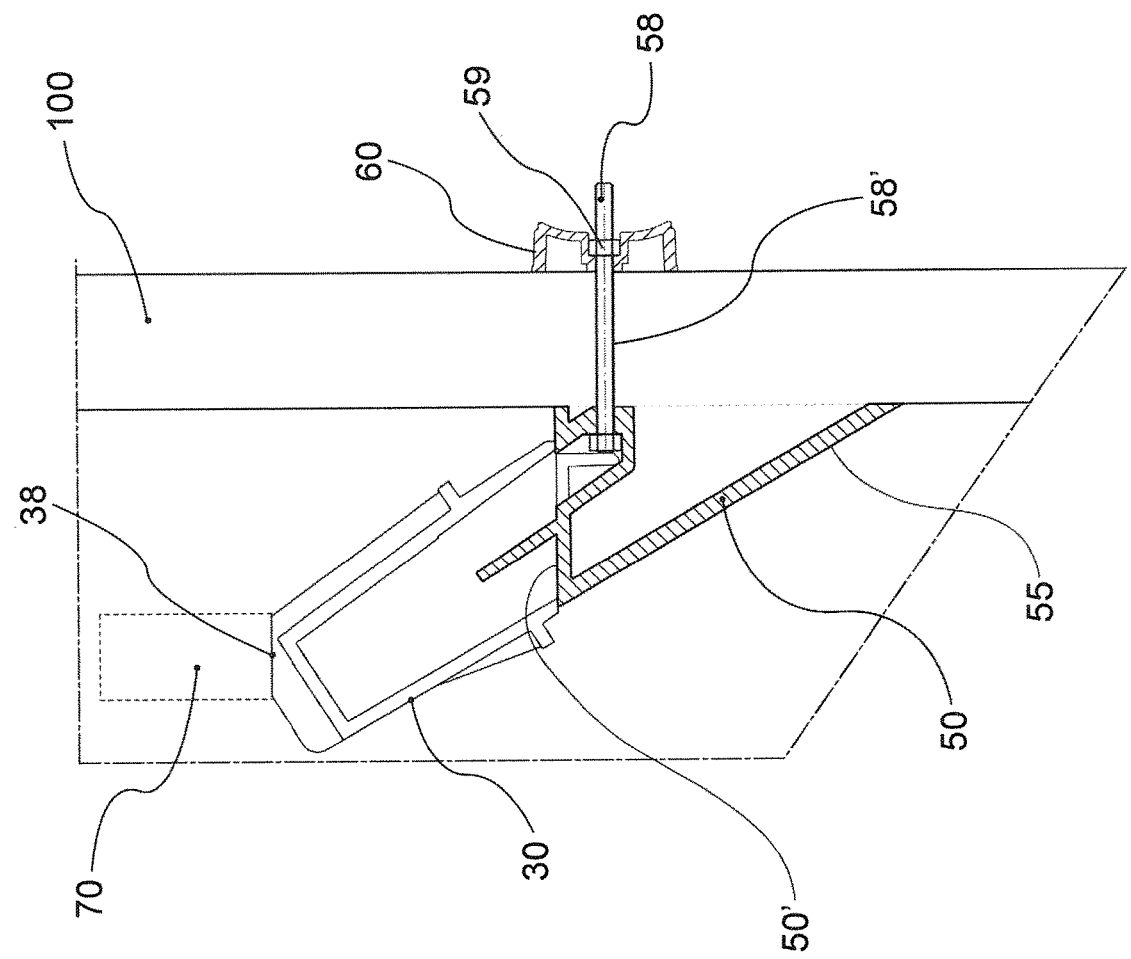

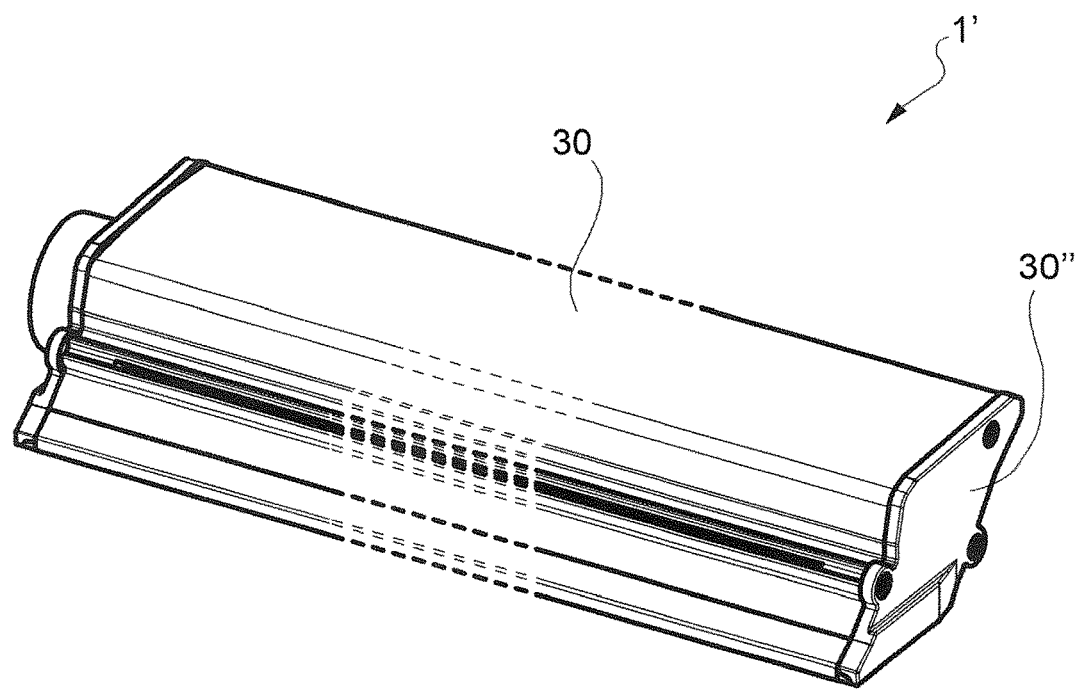
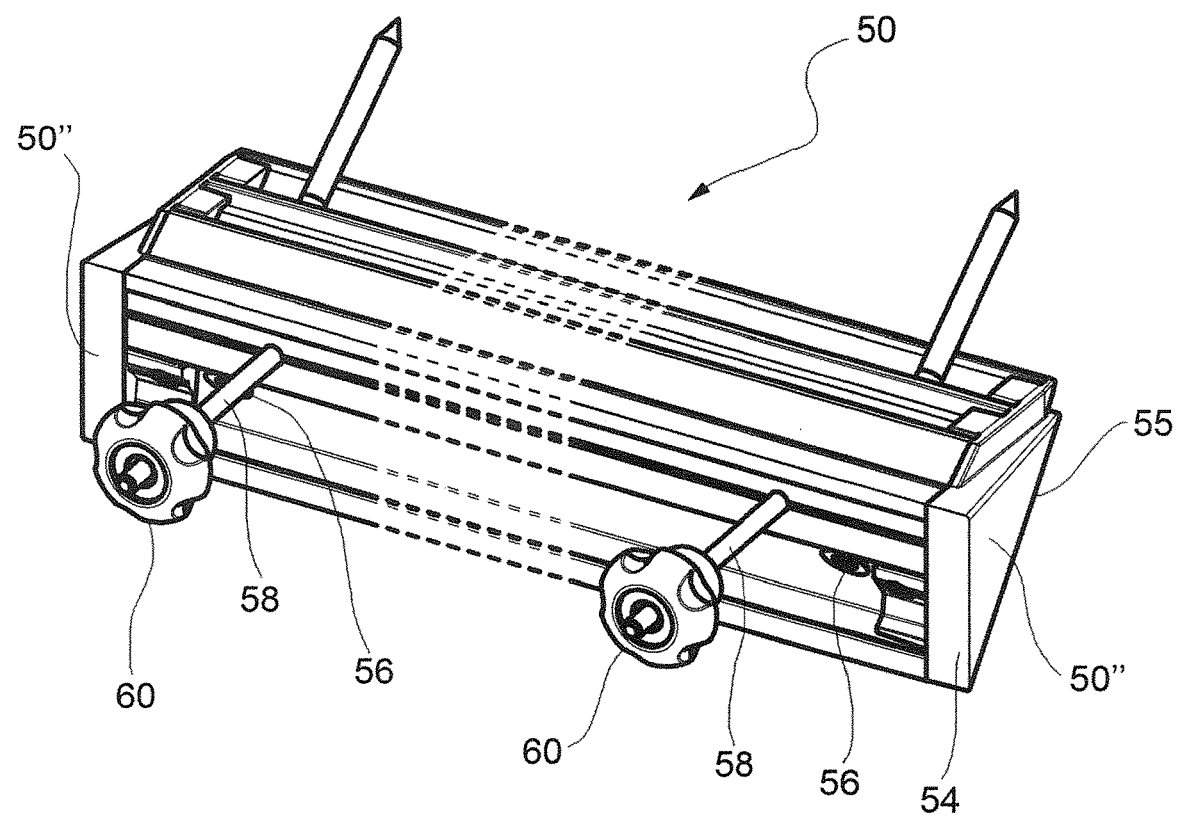
FIG.7a

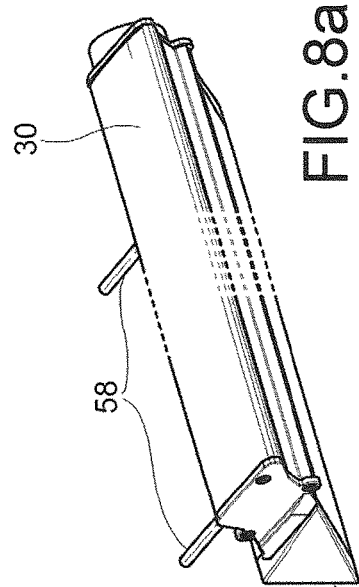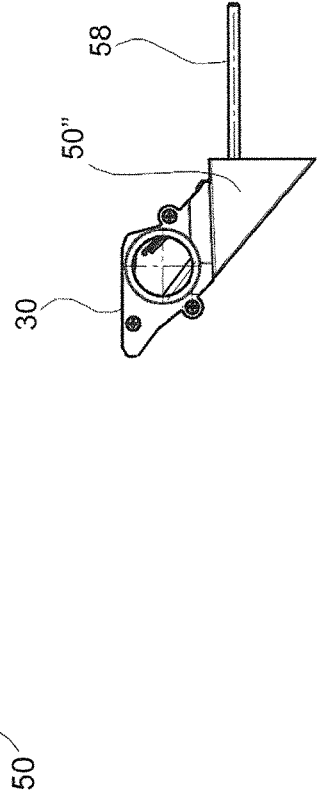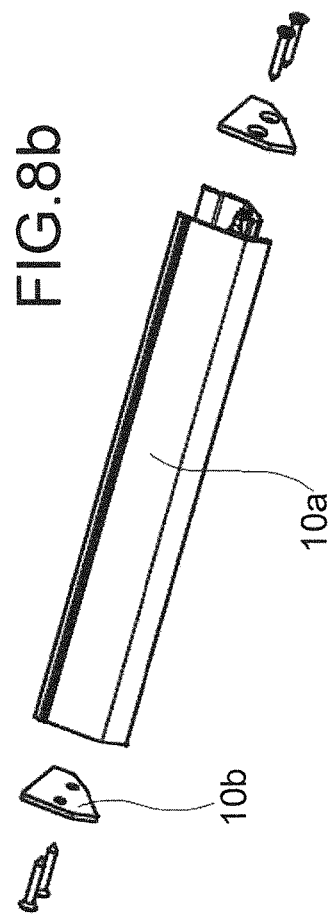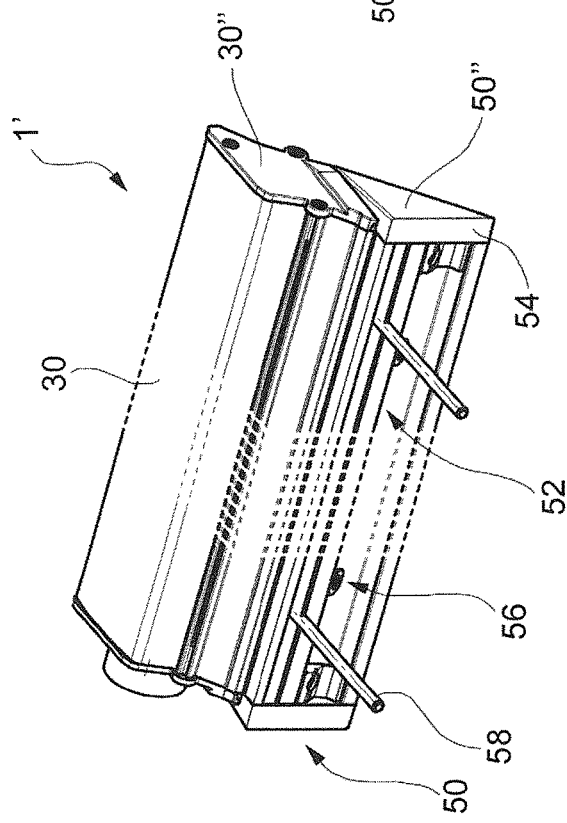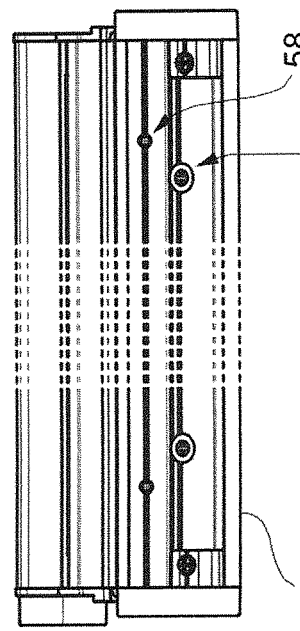
FIG.8a
FIG.8b
FIG.9
FIG.8
FIG.8c

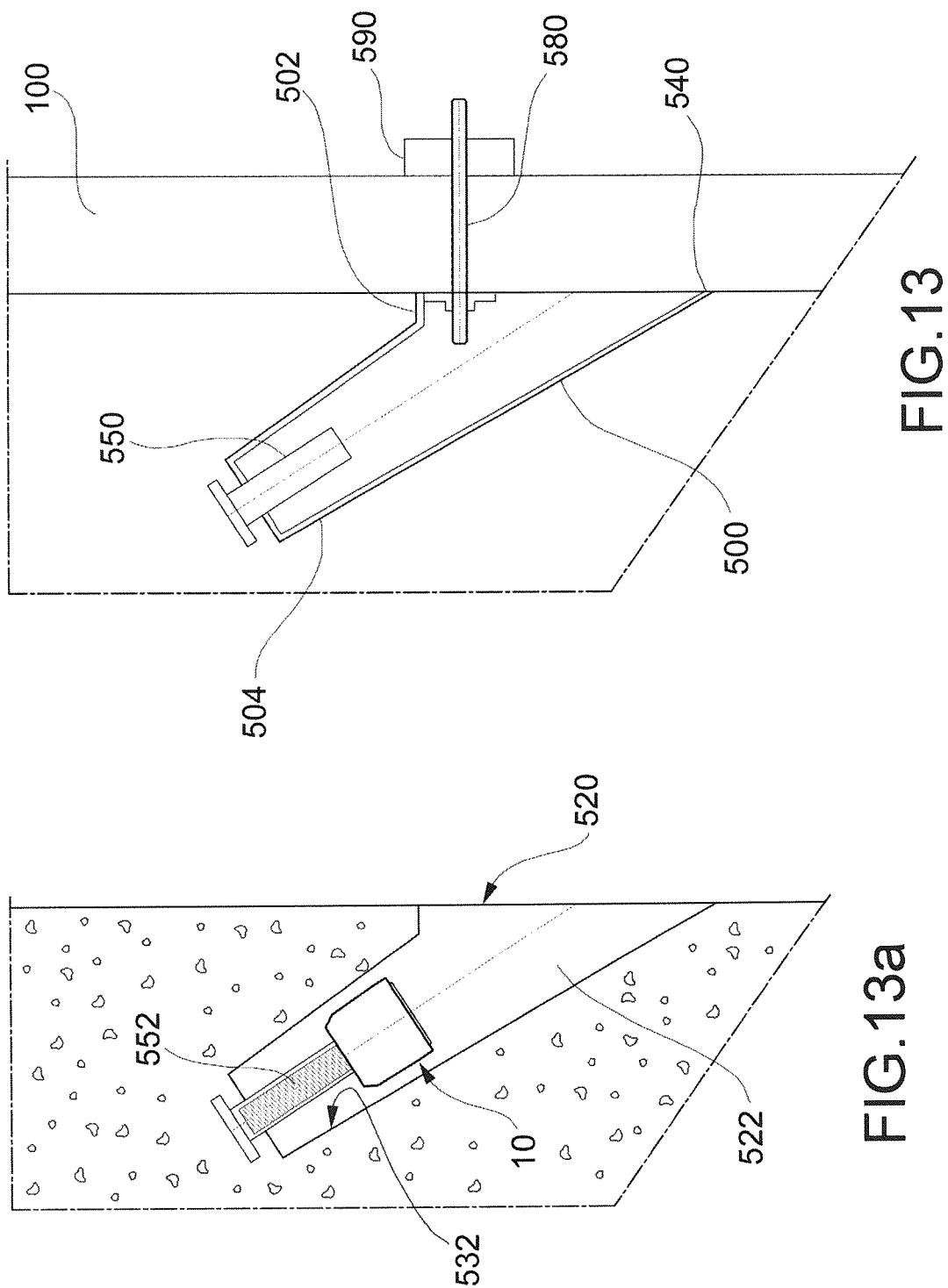

ASSEMBLY AND METHOD FOR REALISING A LAMP INCORPORATED INTO A MASONRY WALL

CROSS-REFERENCE TO RELATED APPLICATIONS

This application is the U.S. National Stage Application of International Patent Application No. PCT/IB2016/056807, filed on Nov. 11, 2016, which claims priority to Italian Patent Application No. 102015000072451, filed on Nov. 13, 2015, and Italian Patent Application No. 102016000083693, filed on Aug. 9, 2016 the contents of each of which is incorporated herein by reference in its entirety.

FIELD OF TECHNOLOGY

This invention relates to an assembly and a method for realising a lamp incorporated in a masonry wall, in particular in a reinforced cement wall.

BACKGROUND

Embodiments are already known of built-in lamps, i.e., having a housing that houses the lighting source placed in a seat formed in a masonry wall or extending inside a cavity created by a plasterboard panel.

In the case of a masonry wall, a gap is usually made in the wall and, after positioning the lamp, the wall is restored, taking care to connect the visible surface of the wall to the edge of the lamp that delimits the emission opening of the light beam.

Even though the maximum care is taken in restoring the wall around the lamp, an attentive eye will always note the difference between the original wall and the portion reconstructed around the lamp.

Sometimes, to hide the connection area between the reconstructed wall and the lamp, large frames are used around the emission opening of the light beam.

In any case, a method for incorporating a lamp inside a reinforced cement wall has not yet been proposed.

One object of the invention is to propose an assembly and a method for realising a lamp inside a masonry wall, even a bearing wall of reinforced cement, able to obviate the limitations and drawbacks noted above.

Another object of the invention is to propose an assembly and a method that also allow a non-specialised operator, for example the bricklayer himself, to incorporate a lamp inside a masonry wall quickly, safely and, at the same time, very precisely.

SUMMARY

Said objects are achieved with an assembly according to claims 1 and 29 and with a method according to claims 17 and 31. The dependent claims describe preferred embodiments of the invention.

The characteristics and advantages of the assembly and method according to the invention will, in any case, be evident from the following description of its preferred embodiments, provided by way of non-limiting example, with reference to the accompanying drawings, in which:

BRIEF DESCRIPTION OF THE DRAWINGS

FIG. 7*a* is a perspective view of the lamp housing and the mould of FIG. 7 assembled, but before their mutual coupling;

FIGS. 8-8*c* are a front perspective view, a rear perspective view, a side view and a front view of the assembly of FIG. 6 assembled;

FIG. 9 is an exploded perspective view of an example of a lamp body suitable to be housed in the lamp housing of the assembly of FIG. 7;

FIGS. 13 and 13*a* are two schematic views similar to views 10 and 10*a* that illustrate a further embodiment variant of the invention.

DETAILED DESCRIPTION

Figure 1:
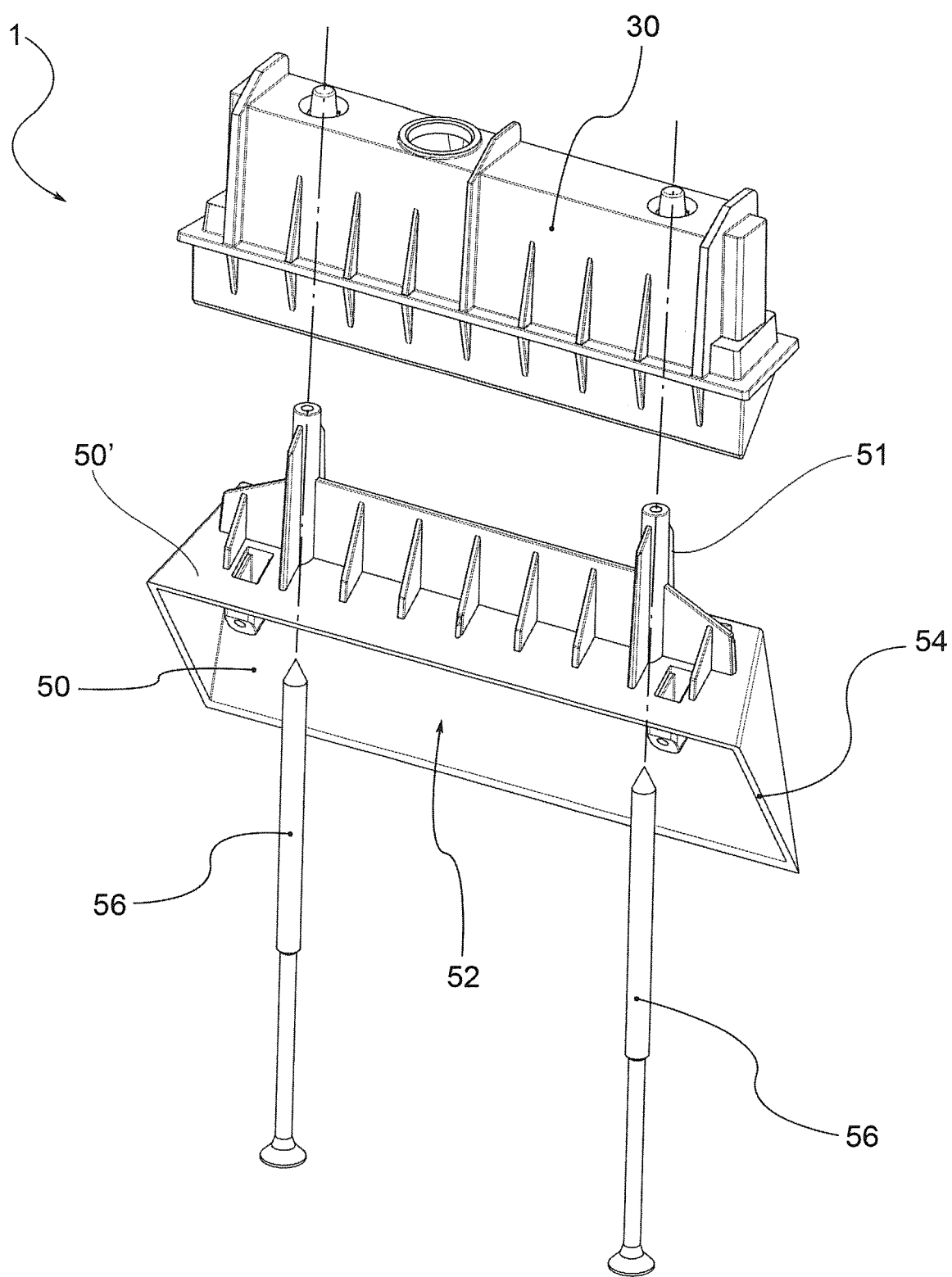
FIG. 1 is a perspective view in separate parts of the assembly according to the invention, comprising a lamp housing and a mould, in a first embodiment.
Figure 2:
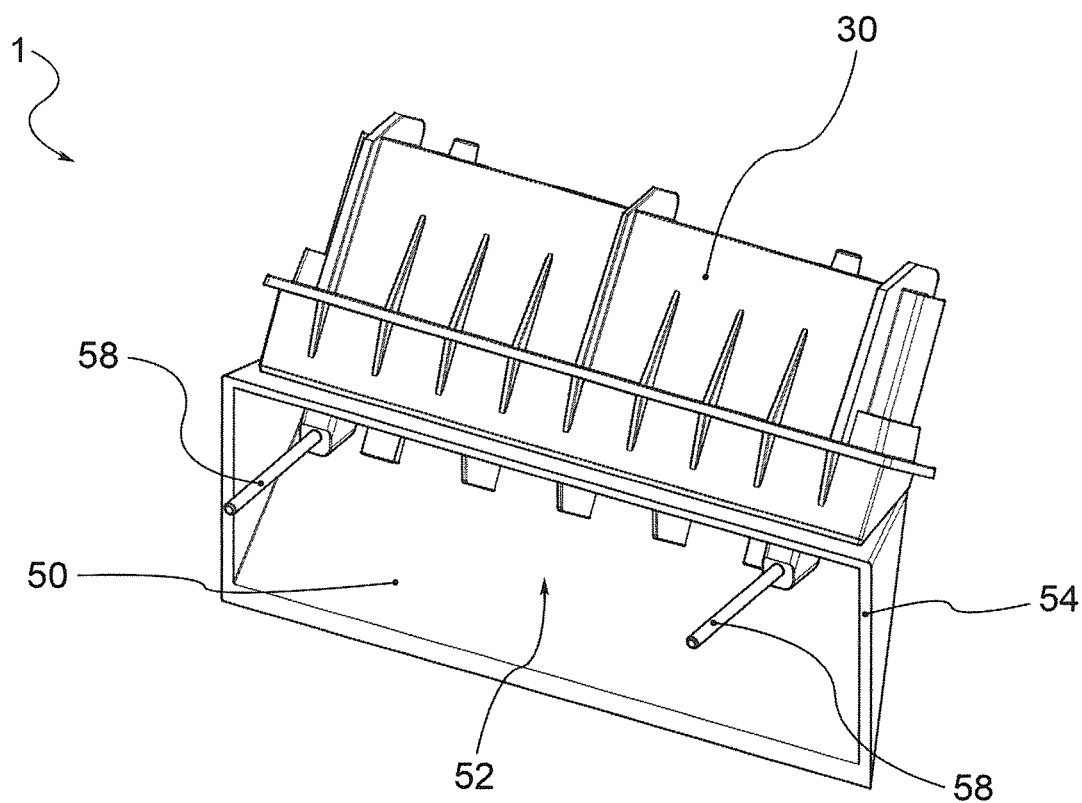
FIGS. 2-2*c* are as many views of the assembly of FIG. 1 assembled.
Figure 2A:
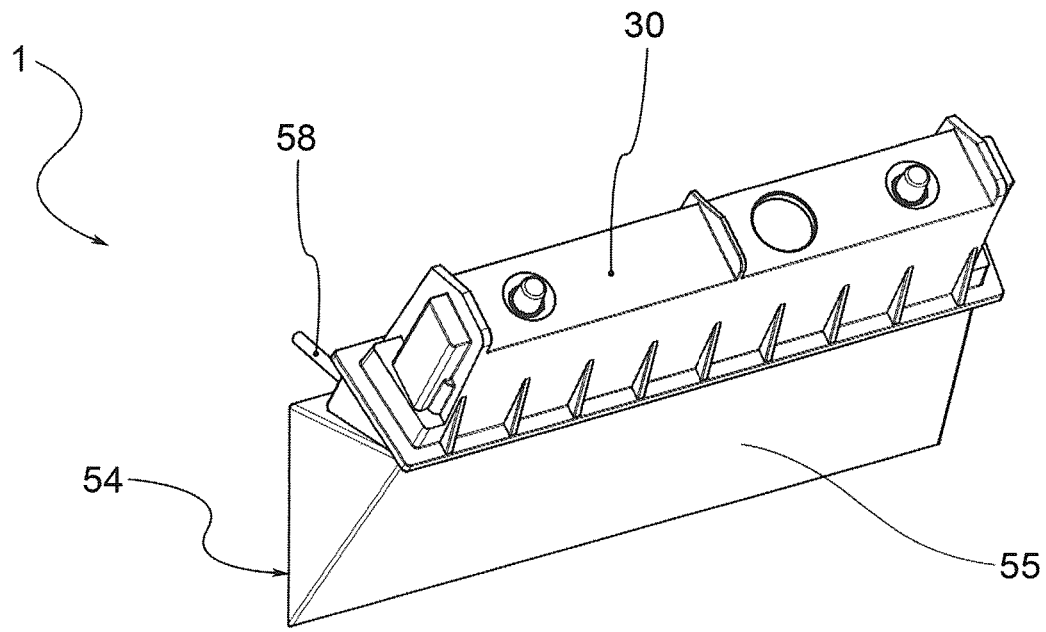
Figures 2B, 2C:
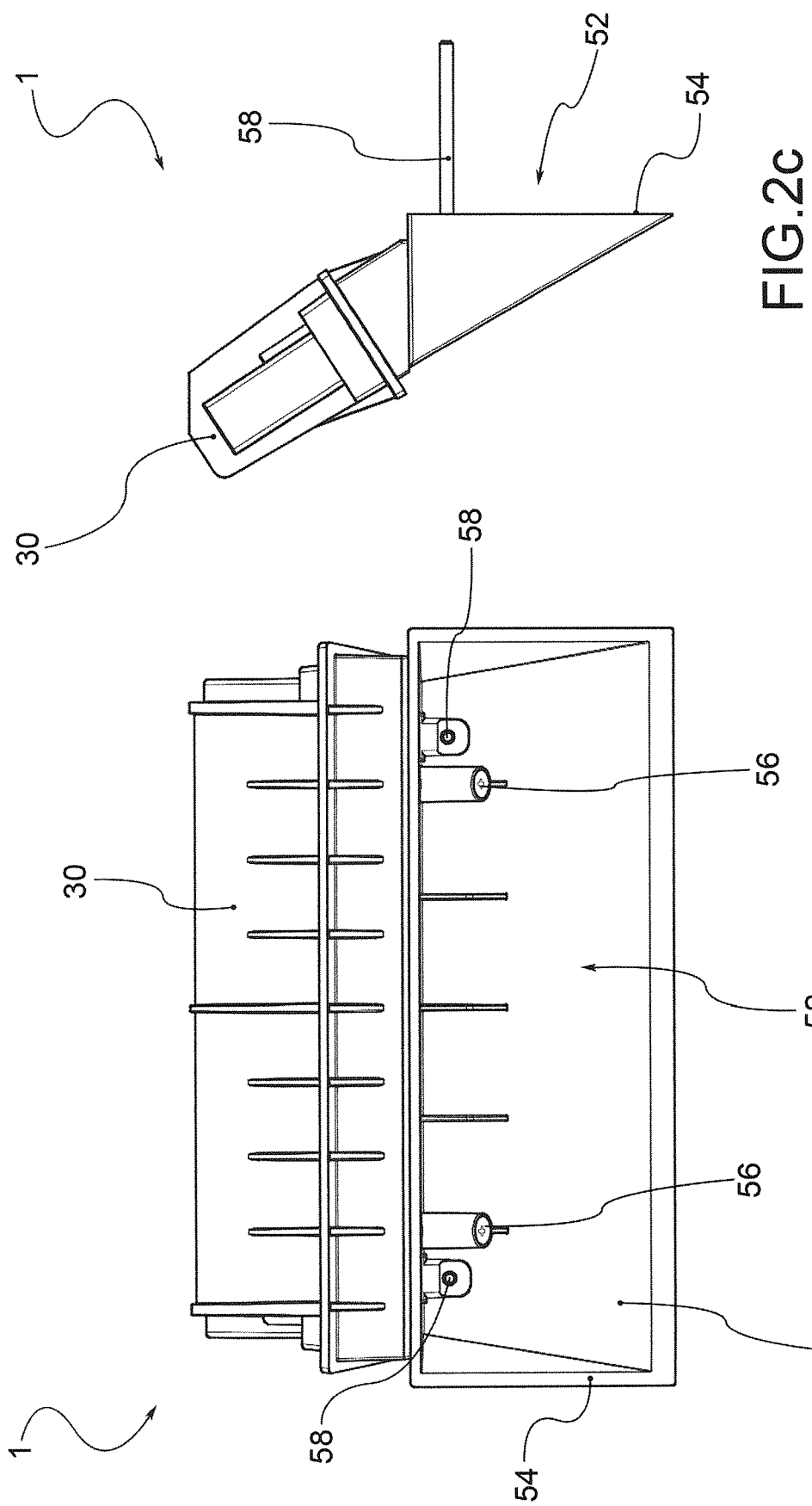
Figure 3:
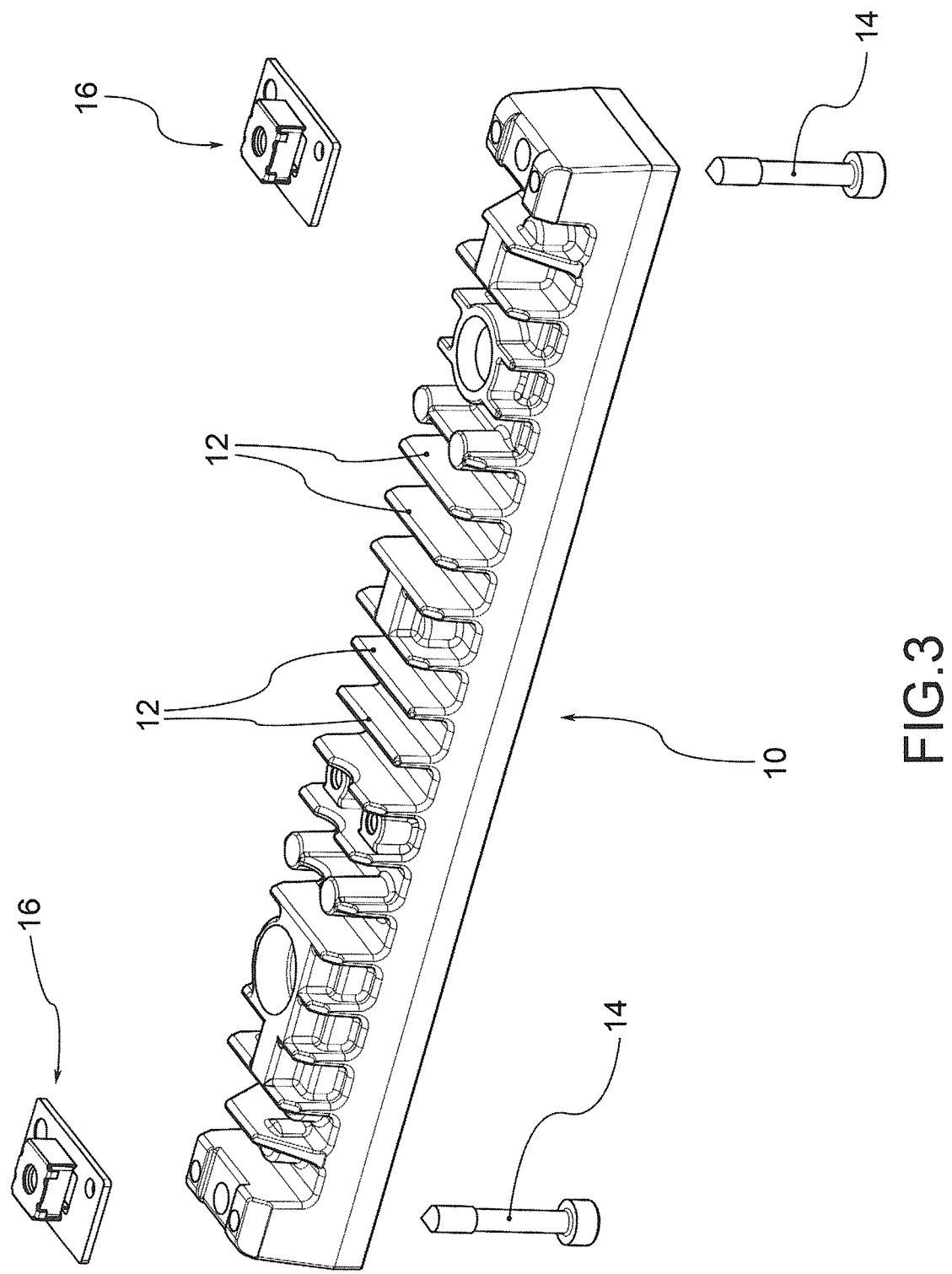
FIG. 3 is a perspective view of an example of a lamp body suitable to be housed in the lamp housing of the assembly of FIG. 1.

In the rest of the description, elements common to the different embodiments, or equivalent to each other, will be indicated with the same reference numbers.

Furthermore, unless otherwise specified, characteristics described with reference to one embodiment may also be employed in other embodiments.

The idea underlying this invention is that of incorporating a lamp in a masonry wall at the time the cement is poured. The devices, described below, that allow realising such a technical solution are in fact suitable to be fixed to the inner side of a formwork 100 in which the cement is poured.

In an embodiment illustrated in FIGS. 1-12, 1; 1' indicates, in its entirety, an assembly according to the invention for realising a lamp incorporated in a masonry wall. A part of the assembly 1; 1' remains incorporated in the cement to serve as a housing of the lamp body, while another part, which served to create the outer form in the cement, i.e., exposed to view, of the lamp, is removed after removing the formwork 100.

In a general embodiment illustrated in FIGS. 1-12, the assembly 1; 1' comprises a lamp housing 30 and a mould 50.

The lamp housing 30 delimits a lamp seat 32 suitable for housing a lamp body 10. The lamp housing 30 is configured and made of a material such as to be suitable to be incorporated in the masonry wall.

The lamp housing 30 delimits an emission window 34 of the light beam generated by the lamp body 10.

The mould 50 is suitable to be removably fixed to the lamp housing 30 on the side of this housing that delimits the emission window 34.

The mould 50 defines a front opening 52, i.e., facing the outside surface of the wall, delimited by a front edge 54 suitable to be placed in contact with the inner side of the formwork 100. The function of the mould is to create, in the solidified cement, a light emission cavity 2 that extends from the emission window 34 and that is open on the outer surface of the masonry wall. In other words, this cavity 2 also defines the outer shape of the lamp, i.e., the front part of the lamp exposed to view.

In an embodiment, the front edge 54 lies in a vertical frontal plane, i.e., parallel to the formwork 100.

In an embodiment, the front edge 54 has a rectangular perimeter.

The mould 50 is suitable to rigidly support the lamp housing 30 before and during the pouring of the cement. In other words, the lamp housing 30, before being incorporated in the cement, is securely fixed to the mould 50, so as to remain in the desired installation position during the pouring of the cement.

In an embodiment, the mould 50 is connectable to the lamp housing 30 by means of mould fastening screws 56 accessible through the front opening 52 of the mould 50.

In an embodiment illustrated in FIGS. 7-12, the mould fastening screws 56 are screwed directly to the lamp housing 30.

More in detail, in an embodiment, a screw guide is formed in the mould 50 for each of the fastening screws 56. This screw guide has an entry hole of diameter less than the diameter of the outer thread of the mould fastening screws 56. Each mould fastening screw 56 has a partial thread that protrudes distally from the screw guide and that screws into a thread seat formed in the lamp housing 30.

This embodiment allows, during the removal of the mould 50, by unscrewing the screw 56 and overcoming the sealing thread of the lamp housing 30, that the screw 56 remains bound to the screw guide and thus to the mould 50.

In an embodiment, the anchoring of the screw to the mould 50 allows the removal of the mould 50 using the mould removal method described below with reference to FIGS. 12-12e.

The mould 50 is provided with mould fastening means suitable to removably fix the mould to the inner side of the formwork 100.

In an embodiment, the mould fixing means comprise threaded tie-rods 58 having one end fixed to the mould 50. The threaded tie-rods 58 have a sufficient length to pass through the thickness of the formwork 100. At the opposite end, on each threaded tie-rod 58 is screwed a threaded nut 59, for example embedded in a knob 60, suitable to be tightened against the outer side of the formwork 100 so put the mould 50 in traction against the formwork 100.

In an embodiment, the mould 50 defines a horizontal plane 50', i.e., perpendicular to the formwork 100, on which the lamp housing 30 rests.

Furthermore, in an embodiment, the rear and lower portion of the mould 50, which connects that is, the rear edge of the horizontal plane 50' to the lower side of the front edge 54, is delimited by an inclined wall 55.

In other words, the mould 50 has a parallelepiped shape with a triangular base, with the frontal plane, in which lies the front edge 54, and the horizontal plane 50' orthogonal to one another.

Additionally, in an embodiment, the lamp housing 30 extends rearwardly from the horizontal side 50' of the mould 50 with an inclination substantially equal to the inclination of the inclined wall 55 with respect to the formwork 100.

In other words, the lamp housing 30 is delimited rearwardly by an inclined wall 31 that, when the lamp housing 30 is connected to the mould 50, is aligned and in continuation of the inclined wall 55 of the mould 50.

Additionally, in an embodiment, from the horizontal plane 50' of the mould 50 extend guide protuberances 51 suitable to be inserted at least partially, with shape-coupling, in the lamp seat 32 lamp housing 30.

Therefore, thanks to the geometry of the assembly 1; 1' described above, once the mould 50 has been placed in traction by the tie-rods 58 against the inner side of the formwork 100 and the lamp housing 30 has been made integral with the mould 50, for example by means of the screws 56, the weight of the cement that weighs on the lamp housing 30 during pouring contributes to making the assembly 1; 1' even more stable and integral with the formwork 100.

Advantageously, it is therefore not necessary to use additional systems to stabilise the assembly during pouring, in particular brackets connecting the lamp housing to the formwork.

In an embodiment, the assembly 1; 1' also includes a lamp body 10 suitable to be housed in the lamp housing 30.

In an embodiment, the lamp body 10 comprises at least one lighting source, for example of the LED type.

In an embodiment, the lamp body 10 comprises one or more rows of LED lighting sources mounted on an electronic printed circuit card.

In an embodiment, the lamp body 10 comprises, in addition to the lighting source, electrical and/or electronic control circuits of the lighting source, a power supply 13 and an electrical connector for electrical connection to power and/or control cables. For example, the electrical or electronic circuits comprise an electronic printed circuit card 10' on which are mounted one or more lighting sources.

The lamp body 10 can also include optical elements to control the light beam generated by the lighting source.

In an embodiment, the lamp body 10 is also provided with means of thermal dissipation of the heat generated by the lighting source, for example a plurality of fins 12 formed on an opposite side with respect to that of the emission of the light beam.

Preferably, the lamp body 10 has, on its side that emits the light beam, a size such as to occupy the width of the emission window 34.

In an embodiment, the lamp body 10, the emission window 34 and the mould 50 are dimensioned in such a way as to allow an insertion of the lamp body in the lamp seat 10 through the light emission cavity 52 and the emission window 34.

In an embodiment, illustrated in FIGS. 1-5, the lamp body 10 is connectable to the lamp housing 30 by means of body fastening screws 14 that are each screwed into a cage nut 16. The cage nuts 16 are positioned for example on the lamp housing 30 on the side opposite the emission window 34.

In an embodiment variant, illustrated in FIGS. 7-12, the lamp body 10 is connectable to the lamp housing 30 by means of a snap-coupling system. For example, the walls of the lamp housing 30 form undercuts 30' that engage corresponding elastic tongues 11 formed in the lamp body 10.

In an embodiment, the lamp housing 30 and the mould 50 are configured in such a way that the emission window 34 is at least partially hidden from view when frontally observing the masonry wall.

Figure 5A:
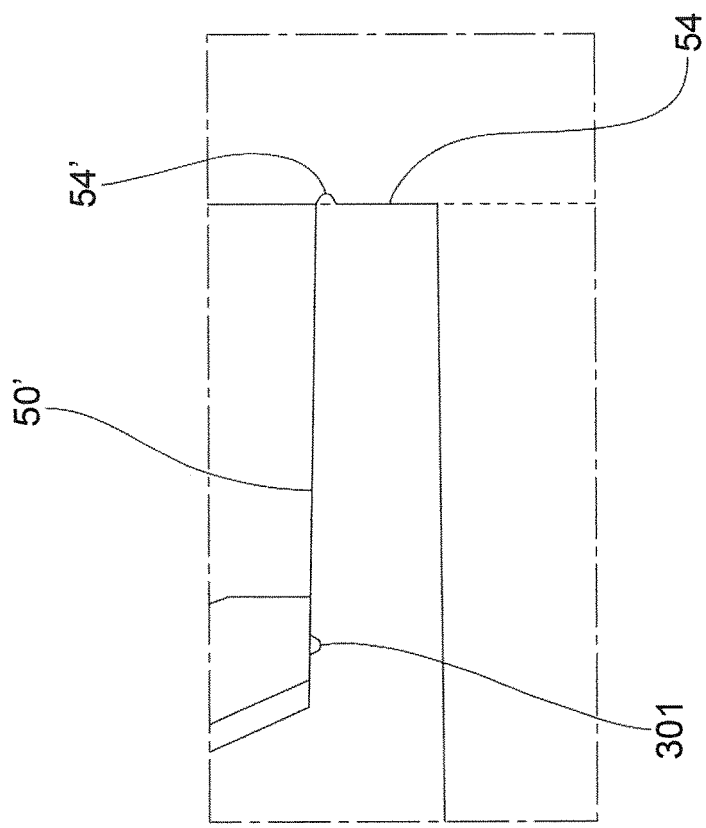
FIG. 5*a* is an enlarged view of detail Y of FIG. 5.
Figure 5:
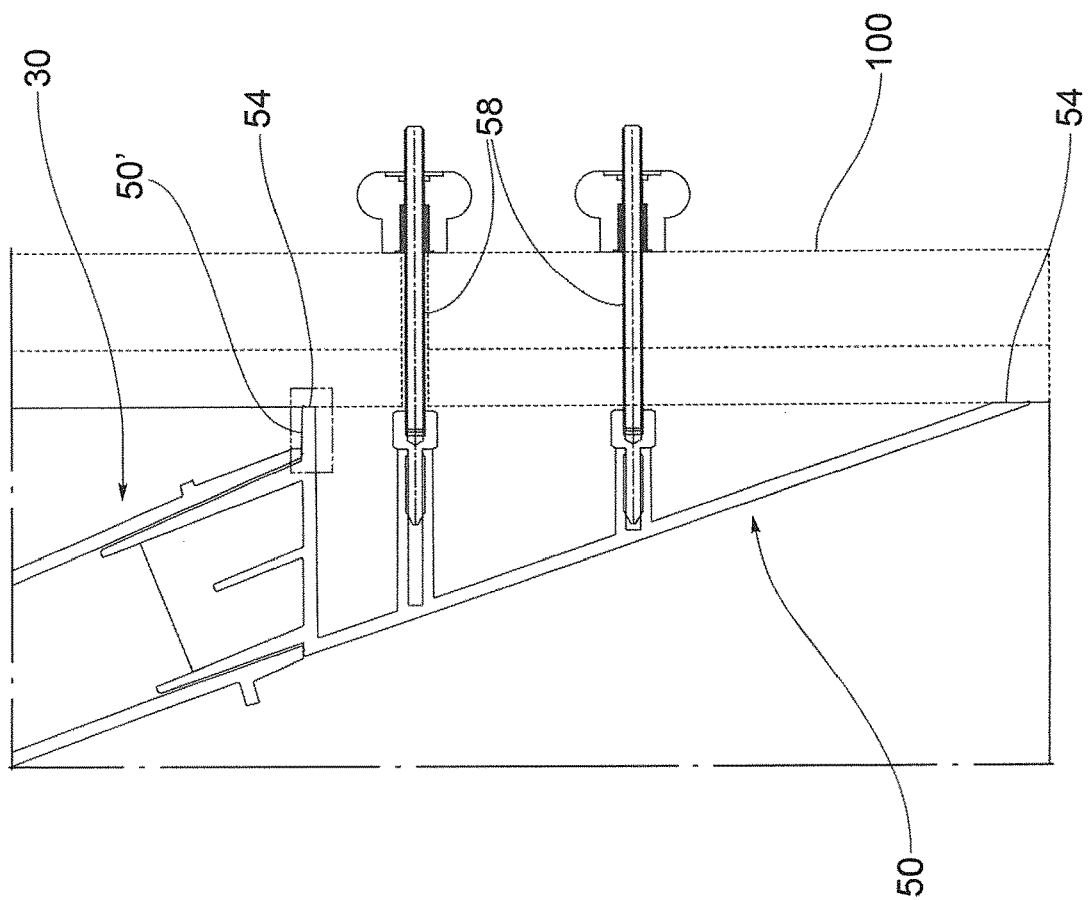
FIG. 5 shows, in section, a part of the assembly according to the invention connected to the formwork in an embodiment variant.
Figure 6:
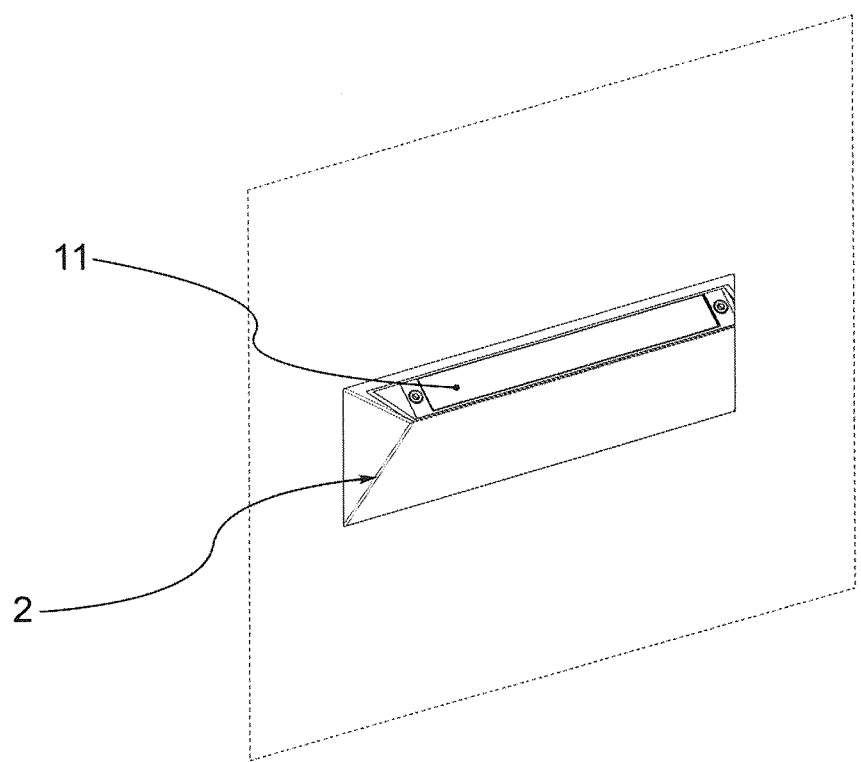
FIGS. 6 and 6*a* represent a bottom perspective view and a front view of the visible part of the lamp built in a wall.
Figure 6A:
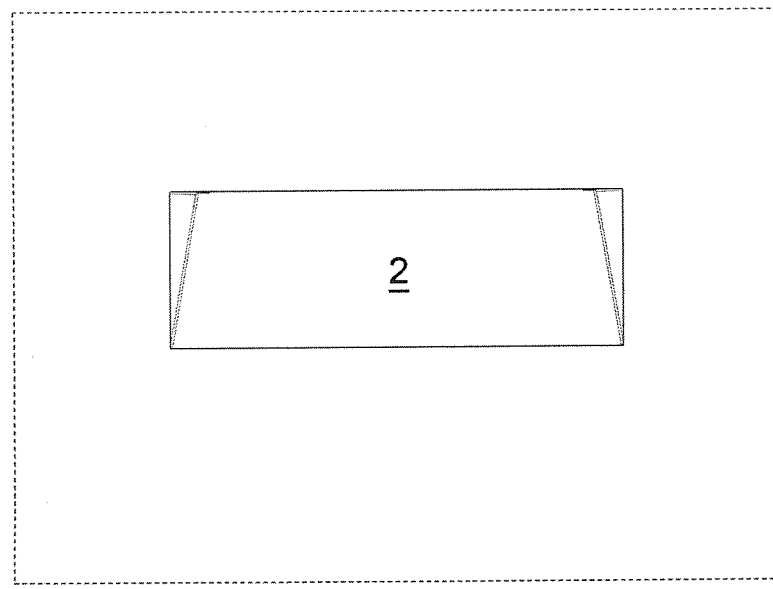
Figure 7:
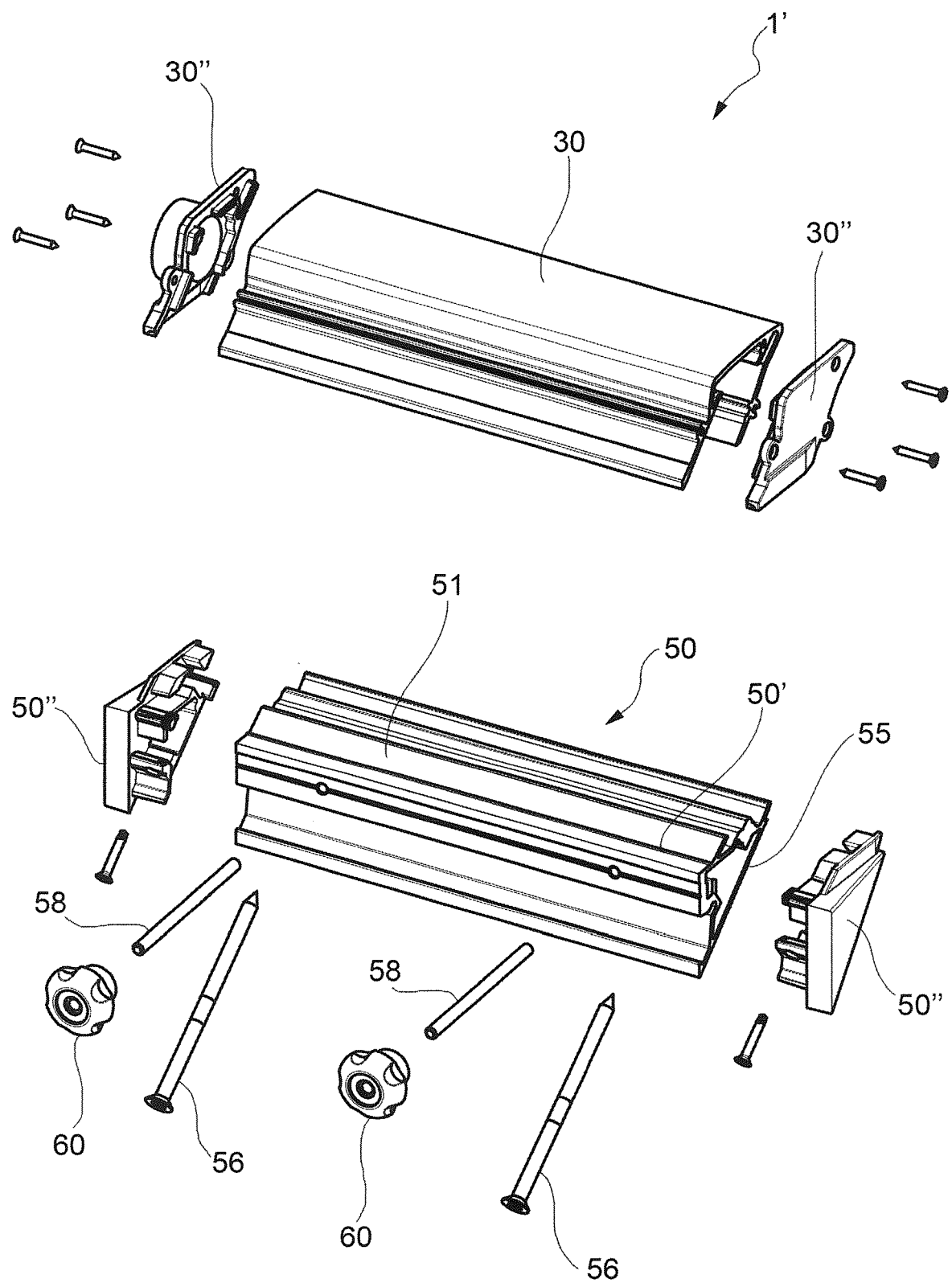
FIG. 7 is an exploded view of the assembly according to the invention, comprising a lamp housing and a mould, in a second embodiment.

In an embodiment illustrated in FIGS. 5 and 5*a*, the front edge 54 of the mould 50 is provided with a formwork perimeter incision tooth 54' suitable to notch the inner side of the formwork 100 when the mould 50 is placed in traction against that inner side of the formwork 100.

Similarly, the lower edge of the lamp housing 30, suitable to rest on the upper horizontal plane 50' of the mould, is provided with a formwork perimeter incision tooth 301 suitable to notch that upper surface 50' when the lamp housing 30 is placed in traction against the mould 50.

In both cases, the purpose of the incision teeth 54', 301 is to notch the respective support surface to improve the coupling of the parts and the insulation against water during pouring.

Such a solution allows improving the definition of the cement profiles of the cavity 2.

In an embodiment illustrated in FIGS. 7-13, the lamp housing 30 and the mould 50 are profiled bodies, preferably made of aluminium, for example, obtained by an extrusion process. These profiles are provided with side closure plugs 30"; 50" of the open side ends of such profiles.

In an embodiment illustrated in the drawings, one of the side closure plugs 30" of the lamp housing is crossed by a hole on which a cable gland is mounted for the connection to a corrugated tube that carries the electrical cables to be connected to the electrical connector of the lamp body 10.

In this way, it is possible to realise lamps of a particularly thin and elongated shape, the length of which can also be chosen at will simply by cutting the starting extruded profile to the desired size.

In an embodiment, the lamp body 10 also includes a profile 10*a*, preferably made of aluminium, closed by side plugs 10*b*.

In an embodiment, the lamp housing forms, on its outer surface, a horizontal support plane 38 for a tilt detection device, for example a bubble device 70.

The method for incorporating a lamp in a masonry wall uses the assembly 1; 1' described above in the following manner.

The mould 50 is connected to the lamp housing 30, for example by screwing the mould fastening screws 56.

Figure 10:
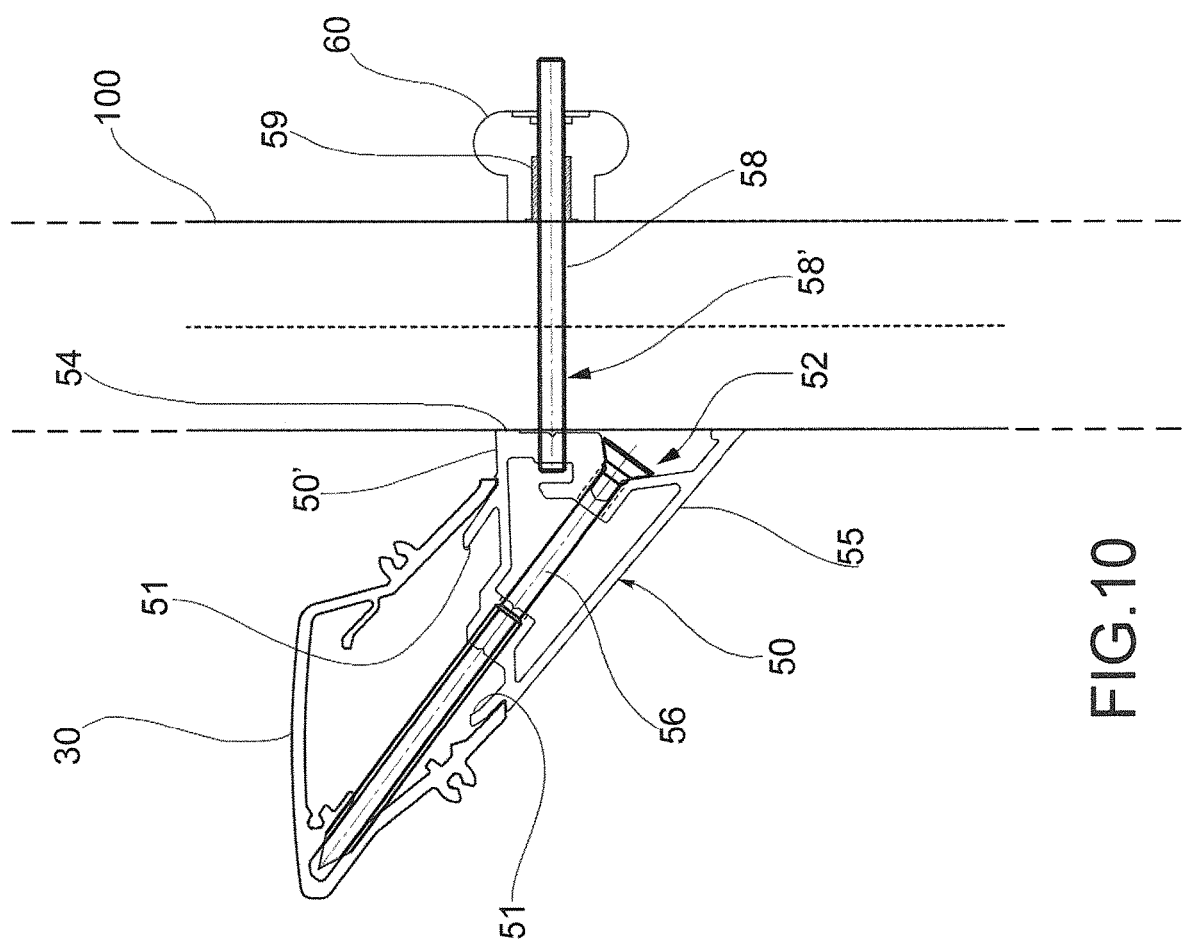
FIGS. 10 and 10*a* are two sectional views illustrating, respectively, the assembly of FIG. 7 fixed to the formwork before casting and the lamp incorporated in the masonry wall.

Before pouring the cement, the mould 50 carrying the lamp housing 30, is fixed to the inner side of the formwork 100, for example by tightening the threaded tie-rods 58 (FIGS. 4 and 10).

In an embodiment, a release agent can be spread on the mould 50 to facilitate its subsequent removal.

In an embodiment, the lamp housing 30 is connected to the corrugated tube that carries the electrical cables.

At this point, it is possible to pour the cement.

After the cement has hardened, the formwork 1 can be removed. For example, to remove the formwork, it is first necessary to unscrew the nuts 59 from the threaded tie-rods 58 (FIG. 4*a*).

Figure 4C:
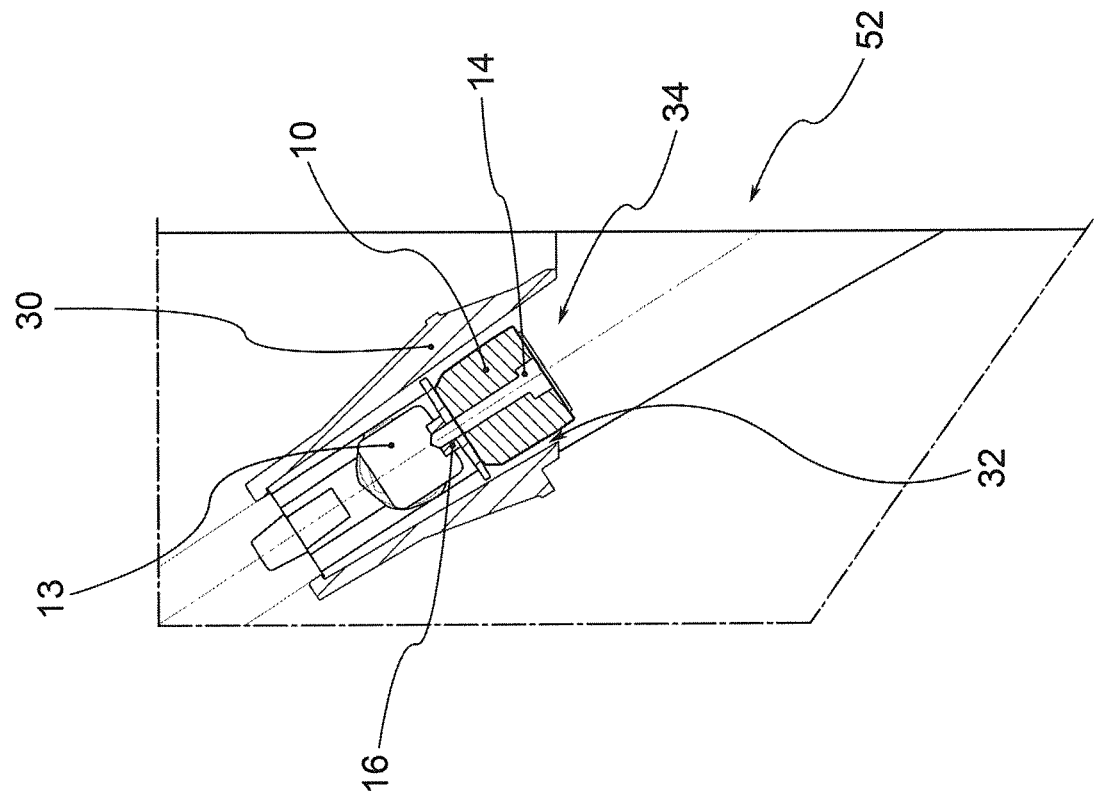
FIGS. 4-4*c* schematically illustrate as many steps of the method of installation of the lamp according to the invention, which employs the assembly of FIG. 1.
Figure 4B:
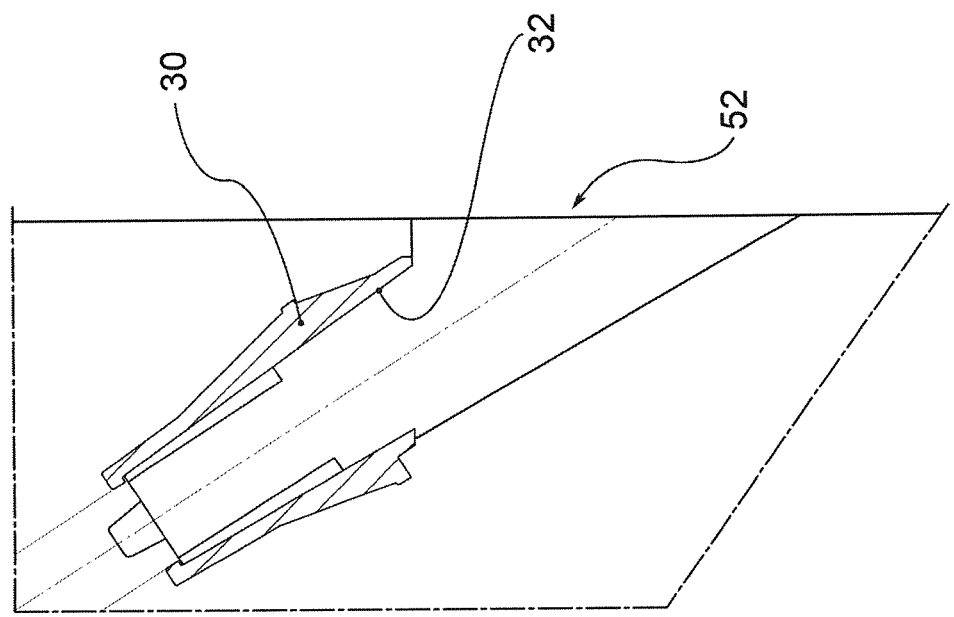

Then, the mould 50 can be removed from the lamp housing 30, for example by unscrewing the mould fastening screws 56 (FIG. 4*b*).

Figure 12:
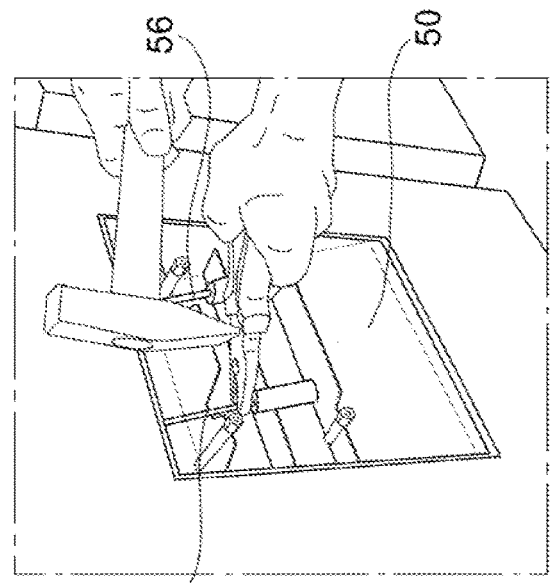
FIGS. 12-12*e* represent as many steps of the method of removing the mould of the assembly of FIG. 7, in an embodiment.
Figure 12A:
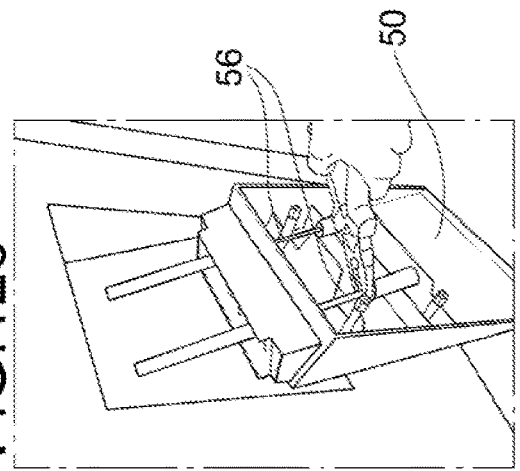
Figure 12B:
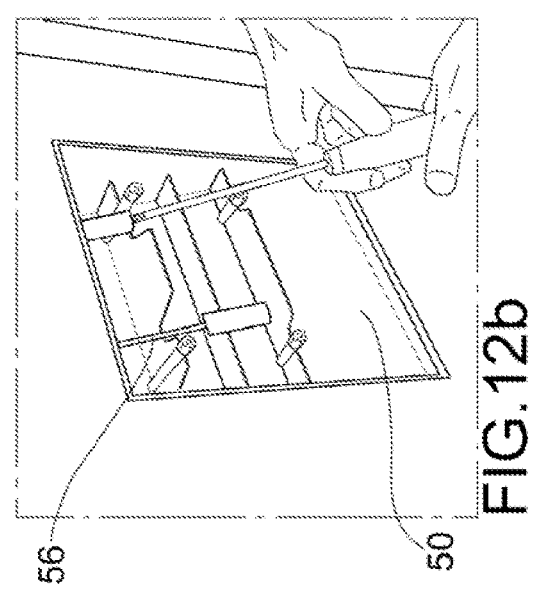
Figure 12C:
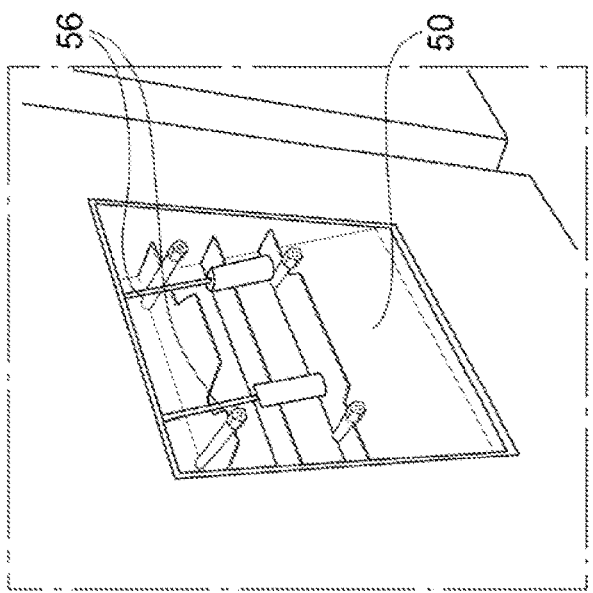
Figure 12D:
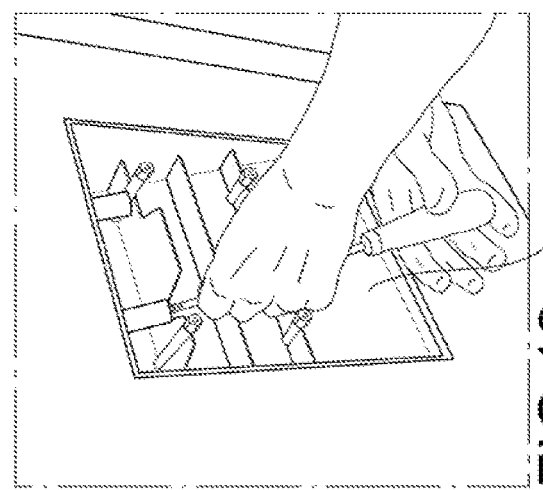
Figure 12E:
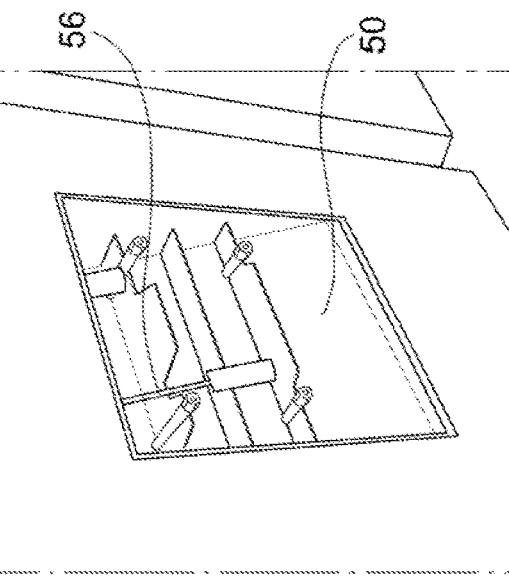

FIGS. 12-12*e* show a sequence of operations for removing the mould 50, in an embodiment.

In particular, FIGS. 12-12*c* illustrate the unscrewing of the mould fastening screws 56 from the lamp housing 30. As can be seen, mould fastening screws 56 are not completely removed from the assembly 1', since each screw remains bound to the respective screw guide of the mould 50. The fastening screw 56, remaining bound to the mould 50, but no longer to the lamp housing 30, allows easy removal of the mould 50 itself, since the axis of extraction of the mould 50 coincides with the axis of the screw 56. Therefore, the fastening screw 56 is used as a point of application of the force necessary to detach the mould 50 from the cement.

For example, one or more of the fastening screws 56 are used to remove the mould 50 from its seat in the masonry wall by means of hammer blows. For example, as illustrated in FIG. 12*d*, a fastening screw 56 is gripped between the jaws of a pliers and the pliers are hit with hammer blows.

FIG. 12*e* shows the mould 50 completely removed from its seat.

Figure 10A:
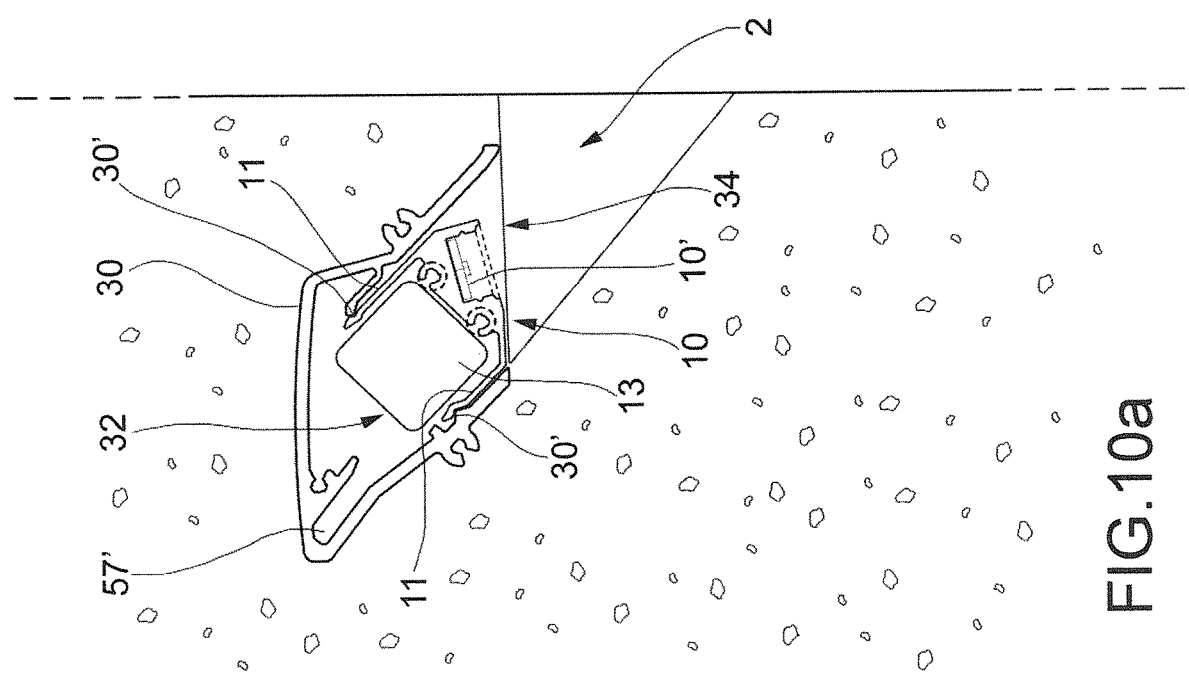
Figure 11:
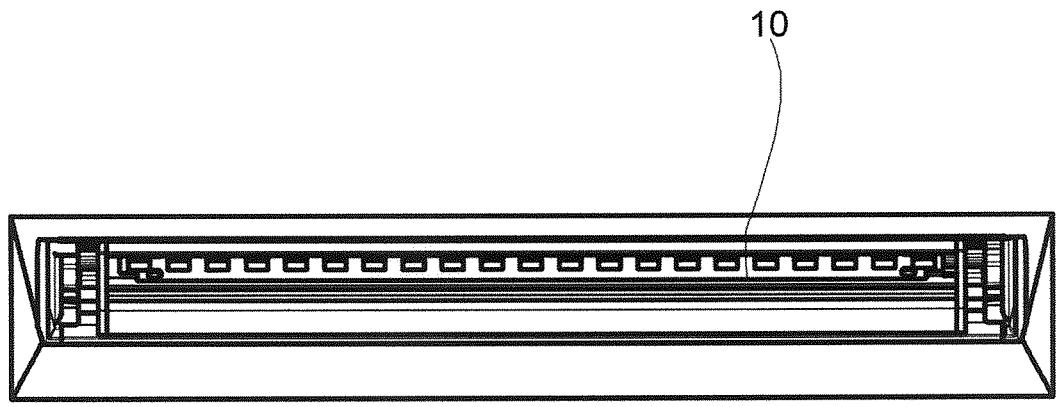
FIGS. 11 and 11*a* represent a bottom view and a front view of the lamp built in a wall through the use of the assembly of FIG. 7.
Figure 11A:
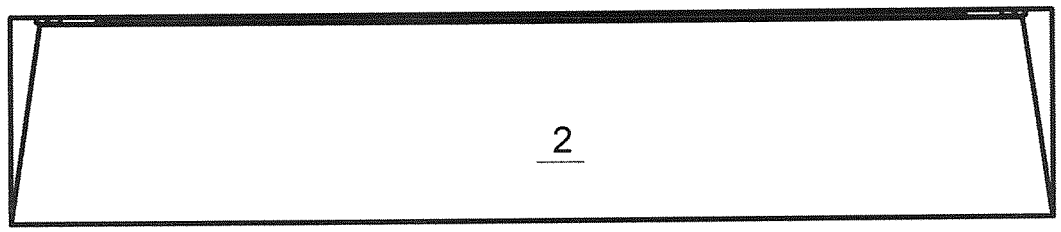

At this point, it is possible to insert the lamp body 10 inside the lamp seat 32, for example by screwing the body fastening screws 14 to the cage nuts 16 (FIG. 4*c*), or by using a snap-coupling (FIG. 10*a*).

In the case of use of threaded tie-rods 58 to fix the mould 50 to the inner side of the formwork 100, it is first necessary to drill through holes 58' in the formwork 1. The threaded tie-rods 58 are made to pass through these through holes 58' and a nut 59 is screwed on the end portion of each threaded tie-rod protruding from the outer side of the formwork 100.

Figure 14:
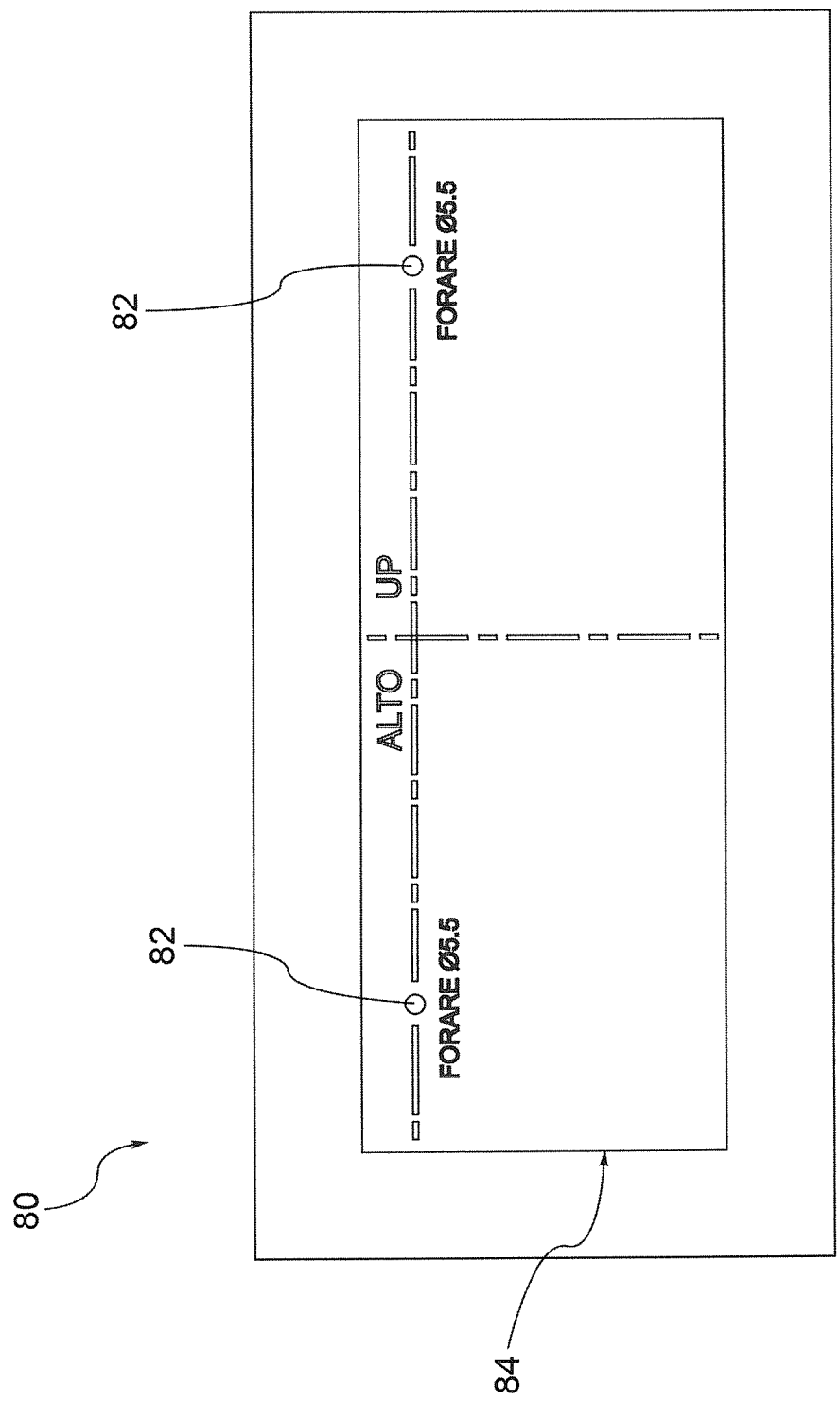
FIG. 14 shows an example of a template applicable to a formwork to facilitate the positioning of the lamp with respect to the wall in which it is incorporated.

In an embodiment, to facilitate the drilling of the formwork 100, a template 80 (FIG. 14) is applied on the outer side of the formwork, for example, an adhesive sheet with an indication 82 of the position of the through holes 58'.

In an embodiment, the template 80 also has, in addition to the indication 82 of the position of the through holes 58', the contour 84 of the front edge 54 of the mould 50, so that, especially in the case of installation of a plurality of lamps in the wall, it is possible to check the positioning of the lamps (height from the floor, distance between lamps, etc.) before pouring the cement.

In addition, as a further check of the correct installation of the mould-lamp housing assembly, before pouring, it is possible to place a tilt detection device 70 on the horizontal plane 38 of the lamp housing 30.

FIGS. 6 and 6*a*, 11 and 11*a* show the result of the installation method of the lamp in a masonry wall as described above.

Observing the wall frontally, of the whole lamp one sees only the emission cavity of the light 52. In other words, when the lamp is switched on it light is seen coming out of the wall, but no structural elements of the lamp can be seen, such as frames, fastening elements, etc.

FIGS. 13 and 13*a* show an embodiment variant of the invention, wherein the mould is also used to create the seat housing the lamp body 10 in the masonry wall. In other words, in this embodiment, the lamp housing is made in one piece with the mould, so that the lamp body 10, once the mould has been removed, is anchored directly to the masonry wall.

The mould, indicated by 500 in FIGS. 13 and 13*a*, comprises a front portion 502 terminating with a front edge 540 suitable to be placed in contact with the inner side of the formwork 100. The front edge 540 delimits a front light emission opening 520.

From the front portion 502, extends a rear portion 504, suitable to realise a lamp seat 532 in the masonry wall suitable to house the lamp body 10.

The mould 500 is provided with mould fastening means suitable to removably fix the mould 500 to the inner side of the formwork 100.

More in detail, the front portion 502 forms, after casting cement in the formwork, a light-emission cavity 502 that extends from the lamp seat 532 and that is open on the outer surface of the masonry wall.

In an embodiment, the rear portion 504 extends from the front portion 502 in such a way that, when the lamp body 10 is inserted in the lamp seat 532, the lamp body 10 is at least partially hidden from view when observing the masonry wall from the front.

In an embodiment, the mould fixing means comprise threaded tie-rods 580 having one end fixed to the mould 500. Each threaded tie-rod 580 passes through the formwork 100 and is engaged, at the opposite end with respect to the mould 500, by a nut 590 acting on the outer side of the formwork 100.

In an embodiment, the rear portion is suitable to realise, in the masonry wall, anchoring means of the lamp body 510.

For example, the anchoring means comprise threaded seats suitable to receive threaded anchoring tie-rods 552.

In an embodiment variant, the anchoring means are suitable to realise a snap-coupling with the lamp body 10.

As per the assembly described above, in an embodiment, the mould 500 comprises a profiled mould body, preferably made of aluminium or plastic, for example obtained through an extrusion process, and a pair of closure side plugs of the open side ends of the mould body.

In an embodiment, the mould 500 is suitable to be connected, for example by means of one of the side plugs, to a corrugated tube carrying the electrical cables to be connected to the lamp body 10.

In this embodiment, the method for incorporating the lamp in the masonry wall comprises the following steps.

Before pouring the cement in the formwork 100, the formwork 500 is fixed to the inner side of the formwork.

Then a step can be provided of spreading a release agent on the mould 500.

In an embodiment, the mould 500 is connected to the corrugated tube.

At this point, it is possible to pour the cement.

After the cement has hardened, the formwork is removed. The mould 500 is then extracted from the masonry wall.

At this point, the lamp body 10 can be anchored to the lamp seat that the rear portion of the mould has realised in the wall.

In an embodiment, the fixing of the mould 500 to the formwork provides for making through holes in the formwork, passing the threaded tie-rods 580 integral to the mould 500 through the through holes, screwing a nut 590 on the terminal portion of each threaded tie-rod protruding from the outer side of the formwork.

In an embodiment, the operation of fastening the mould 500 to the formwork 100 is facilitated by positioning, on the outer side of the formwork, a template showing an indication of the position of the through holes to be made in the formwork.

To the embodiments of the assembly and method incorporating a lamp in a masonry wall according to the invention, a technician in the field, to satisfy contingent requirements, may make modifications, adaptations and replacements of members with others functionally equivalent, without departing from the scope of the following claims. Each of the characteristics described as belonging to a possible form of embodiment can be achieved independently from the other embodiments described.

The invention claimed is:

1. An assembly for realizing a lamp incorporated into a masonry wall, comprising: a lamp housing that delimits a lamp seat suitable for housing a lamp body, the lamp housing being suitable to be incorporated in a masonry wall and delimiting an emission window of the light beam generated by the lamp body; and a mould suitable to be removably fixed to the lamp housing on the side that delimits the emission window and having a front opening delimited by a front edge suitable to be placed in contact with the inner side of a formwork, so that the mould realizes, after pouring cement in the formwork, an emission cavity of the light that extends from the emission window and that is open on the outer surface of the masonry wall, the mould being suitable to rigidly support the lamp housing before and during the pouring of the cement and being provided with mould fixing means suitable for removably fixing the mould to the inner side of the formwork.

2. The assembly according to claim 1, wherein the lamp housing and the mould are configured in such a way that the emission window is at least partially hidden from view when frontally observing the masonry wall.

3. The assembly according to claim 1, wherein the mould is connectable to the lamp housing by means of mould fastening screws accessible through the front opening of the mould.

4. The assembly according to claim 1, wherein the mould fastening means comprise threaded tie-rods having one end fixed to the mould and being suitable to cross the thickness of the formwork to be engaged, at the opposite end, by a nut acting on the outer side of the formwork.

5. The assembly according to claim 1, comprising a lamp body comprising at least one lighting source.

6. The assembly according to claim 5, wherein the lamp body, the emission window and the mould are dimensioned in such a way as to allow an insertion of the lamp body in the lamp seat through the cavity emission of the light and the emission window.

7. The assembly according to claim 5, wherein the lamp body further comprises electrical circuits and/or control electronics of the lighting sources and an electrical connector for the electrical connection to power and/or control cables.

8. The assembly according to claim 1, wherein the mould defines a horizontal plane, i.e., perpendicular to the formwork, on which the lamp housing rests.

9. The assembly according to claim 8, wherein the mould is delimited rearwardly and inferiorly by an inclined wall that connects the rear edge of the horizontal plane to the lower side of the front edge.

10. The assembly according to claim 9, wherein the lamp housing extends posteriorly from the horizontal plane of the mould with an inclination substantially equal to the inclination of the inclined wall with respect to the formwork.

11. The assembly according to claim 8, wherein from the horizontal plane of the mould extend guide protuberances suitable to be inserted at least partially, with shape-coupling, in the lamp seat of the lamp housing.

12. The assembly according to claim 8, wherein the front edge of the mould is provided with a formwork perimeter incision tooth suitable to notch the inner side of the formwork when the mould is placed in traction against that inner side of the formwork.

13. The assembly according to claim 8, wherein the lower edge of the lamp housing, suitable to rest on the upper horizontal plane of the mould, is provided with a formwork perimeter incision tooth suitable to notch that upper surface when the lamp housing is placed in traction against the mould.

14. The assembly according to claim 1, wherein the lamp housing forms, on its outer surface, a horizontal support plane for a tilt detection device, for example a bubble device.

15. The assembly according to claim 1, wherein the mould comprises a mould body, for example made of aluminium or plastic, obtained with an extrusion process and a pair of side plugs closing the open side ends of said mould body.

16. The assembly according to claim 1, wherein the lamp housing comprises housing body, for example made of aluminium or plastic, obtained with an extrusion process and a pair of side plugs closing the open side ends of said housing body.

17. A method for incorporating a lamp in a masonry wall using an assembly according to claim 1, comprising the steps of:
  a) connecting the mould to the lamp housing;
  b) before pouring the cement in a formwork, fixing the mould to the inside of the formwork;
  c) pouring the cement;
  d) after the cement has hardened, removing the formwork; and
  e) disconnecting the mould from the lamp housing and removing the mould.

18. The method according to claim 17, wherein, after step e) is carried out, a step f) of fixing a lamp body in the respective seat inside the lamp housing.

19. The method according to claim 17, wherein step b) comprises:
  b1) drill through-holes in the formwork;
  b2) passing threaded tie-rods fixed to the mould through said through-holes; and
  b3) screwing a nut on the end portion of each threaded tie-rod protruding from the outer side of the formwork.

20. The method according to claim 19, comprising, before step b1), the step of fixing on the outer side of the formwork a template bearing an indication of the position of the through-holes.

21. A method for realizing a lamp incorporated into a masonry wall, comprising: a front portion terminating with a front edge suitable to be placed in contact with the inner side of a formwork, said front edge delimiting a front light-emission opening; a rear portion that extends from said front portion and that is suitable to realize a lamp seat in the masonry wall suitable to house a lamp body; and mould fastening means suitable to removably fix the mould to the inner side of the formwork, wherein said front portion forms, after casting of cement in the formwork, a light-emission cavity that extends from the lamp seat and that is open on the outer surface of the masonry wall.

22. The mould according to claim 21, wherein the rear portion extends from the front portion in such a way that, when the lamp body is inserted in the lamp seat, said lamp body is at least partially hidden from view when observing the masonry wall from the front.

23. The mould according to claim 21, wherein the mould fastening means comprise threaded tie-rods having one end fixed to the mould and being suitable to cross the thickness of the formwork to be engaged, at the opposite end, by a nut acting on the outer side of the formwork.

24. The mould according to claim 21, wherein the rear portion is suitable to realise, in the masonry wall, anchoring means of the lamp body.

25. The mould according to claim 24, wherein said anchoring means comprise threaded seats suitable to receive threaded anchoring tie-rods.

26. The mould according to claim 24, wherein said anchoring means are suitable to realise a snap-coupling with the lamp body.

27. The mould according to any of claim 21, comprising a mould body, for example made of aluminium or plastic, obtained with an extrusion process and a pair of side plugs closing the open side ends of said mould body.

28. A lamp assembly comprising a mould according to claim 21 and a lamp body comprising at least one lighting source.

29. The assembly according to claim 28, wherein the lamp body comprises electrical circuits and/or control electronics of the lighting sources, an electrical connector, and a power supply.

30. The method for incorporating a lamp in a masonry wall using a mould according to claim 21, comprising the steps of:
  a) before pouring the cement in a formwork, fixing the mould to the inner side of the formwork;
  b) pouring the cement;
  c) after the cement has hardened, removing the formwork; and
  d) removing the mould.

31. The method according to claim 30, wherein, before step b), the mould is connected to a corrugated electrical cable transport duct.

32. The method according to claim 30, wherein, after step d) a step e) is performed of fixing a lamp body in the respective lamp seat.

33. The method according to any of claim 30, wherein step a) comprises:
  a1) drilling through-holes in the formwork;
  a2) passing threaded tie-rods integral to the mould through said through-holes; and
  a3) screwing a nut on the end portion of each threaded tie-rod protruding from the outer side of the formwork.

34. The method according to claim 33, comprising, before step a1), the step of fixing on the outer side of the formwork a template bearing an indication of the position of the through-holes.

* * * * *